US006056841A

United States Patent [19]

Knokey

[11] Patent Number: 6,056,841

[45] Date of Patent: May 2, 2000

[54] METHOD AND APPARATUS FOR JOINING VENEER PIECES WITH LAP JOINT HAVING SQUARE CUT EDGES AND REDUCED THICKNESS

[75] Inventor: Eugene R. Knokey, Anacortes, Wash.

[73] Assignee: The Coe Manufacturing Company, Portland, Oreg.

[21] Appl. No.: 09/436,093

[22] Filed: Nov. 8, 1999

Related U.S. Application Data

[62] Division of application No. 09/075,020, May 8, 1998.

[51] Int. Cl.[7] .................... B29C 65/00

[52] U.S. Cl. .................... 156/228; 156/159; 156/304.5; 156/304.6

[58] Field of Search .................... 156/157, 159, 156/228, 258, 304.1, 304.5, 304.6, 502, 583.1

[56] References Cited

U.S. PATENT DOCUMENTS

| | | | |
|---|---|---|---|
| 1,010,706 | 12/1911 | Tönjes . | |
| 3,461,932 | 8/1969 | Shelton et al. | 144/317 |
| 3,686,061 | 8/1972 | Brown et al. | 161/56 |
| 4,435,457 | 3/1984 | Servo et al. | 428/58 |
| 4,443,288 | 4/1984 | Sawada et al. | 156/304.6 |
| 4,507,162 | 3/1985 | Iwamoto | 156/157 |
| 4,725,325 | 2/1988 | Hasegawa | 156/254 |
| 4,761,197 | 8/1988 | Christine et al. | 156/290 |
| 4,927,474 | 5/1990 | Pawloski | 156/66 |
| 4,999,081 | 3/1991 | Buchanan | 156/515 |
| 5,169,697 | 12/1992 | Langley et al. | 428/57 |
| 5,240,050 | 8/1993 | Shing | 144/350 |
| 5,320,698 | 6/1994 | Fournier et al. | 156/159 |

OTHER PUBLICATIONS

Dietrich Fengel and Gerd Wegener, *Wood, Chemistry, Ultrastructure, Reactions,* Walter deGruyter, 1984, pp. 335–338.

A.J. Panhsin and Carl DeZeeuw, *Textbook of Wood Technology,* 3rd Ed., vol. 1, McGraw–Hill Book Co., 1970, pp. 71–72.

*Primary Examiner*—James Sells

*Attorney, Agent, or Firm*—Klarquist Sparkman Campbell Leigh & Whinston, LLP

[57] ABSTRACT

A method and apparatus for joining two pieces of wood veneer with square cut edges by a lap joint with a predetermined thickness not greater than the thickness of a single piece of veneer. The lap joint is formed in a press which may have heated plates for pressing the overlapping portions of the veneer pieces together. The press is provided with adjustable stops for limiting the spacing between the platens in the final pressed position to provide the lap joint with the pre-determined thickness. The lap joint is bonded by glue provided on the surface of at least one of the overlapping portions of the two veneer pieces. The lap joint is heated to an elevated temperature above the lignin softening temperature of the veneer during pressing to enable thermoplastic flow of the wood veneer which produces a lap joint of greater strength. The two platens are formed with anvil surfaces including flat middle surfaces which are parallel, and side surfaces on opposite sides of each middle surface which slope away from each other and which are joined to the middle surface by curved transition portions to avoid cutting the veneer and produce a stronger lap joint.

10 Claims, 3 Drawing Sheets

METHOD AND APPARATUS FOR JOINING VENEER PIECES WITH LAP JOINT HAVING SQUARE CUT EDGES AND REDUCED THICKNESS

REFERENCE TO RELATED APPLICATION

The present application is a divisional application of prior application Ser. No. 09/075,020, filed May 8, 1998.

FIELD OF THE INVENTION

The present invention relates generally to a method and apparatus for joining two pieces of wood veneer with a lap joint of reduced thickness to produce a larger sheet of veneer, and in particular to such method and apparatus for joining two veneer pieces with a lap joint formed between two overlapping square cut edge portions of such pieces by employing a press with platens having adjustable stops for setting the final press spacing between such platens to produce a lap joint of pre-determined thickness which is not greater than the thickness of a single veneer piece. As a result of using the method and apparatus of the present invention, scrap veneer pieces of small size can be joined together with lap joints of great strength to provide a sheet of veneer suitable for use with other sheets in the formation of plywood or laminated veneer lumber of conventional size such as four feet wide by eight feet long.

BACKGROUND OF THE INVENTION

It has previously been proposed in U.S. Pat. No. 3,461,932 of Shelton et al., issued Aug. 19, 1969, to provide a process for manufacturing continuous veneer strip by joining two pieces of veneer with a joint formed between scarfed cut ends providing beveled surfaces at the edges of the veneer. This has the disadvantage that the scarfed or chamfered ends are fragile so they break easily and frequently do not mate exactly and so they must be overlapped to ensure a good joint. The joint is bonded by after applying a glue to portions of the veneer pieces adjacent the scarfed ends of the veneer and placing the overlapping pieces in a heated press to form the joint. U.S. Pat. No. 3,686,061 of Brown et al., shows a similar method for producing plywood panels using multiple sheets of veneer which are formed by joining smaller pieces of veneer with glued joints between chamfered edges which are overlapped and glued together by pressing in a traveling press having heated platens for bonding the glue to form such lap joint. However, unlike the method and apparatus of the present invention, these prior methods produce lap joints of reduced strength and of an uncertain thickness which varies from joint to joint because unlike the present invention they do not produce lap joints having square cut edges and do not employ adjustable stops to set the final spacing between platens to ensure that the joint has a pre-determined thickness which is no greater than the thickness of one sheet of veneer in the manner of the present invention. In addition, there is no indication that these prior methods heat the lap joint above the lignin softening temperature of the veneer to allow a thermoplastic flow of the wood during pressing in the manner of the present invention to produce a stronger lap joint.

It is known that wood may be changed in shape after heating it above its lignin softening temperature. The lignin softening temperature of various wood is described in the book, "Wood Chemistry, Ultrastructure, Reactions" by Deitrich Fengel and Gerd Wegener, on pages 335–338, published in 1984. It should be noted that the lignin softening temperature of wood veneer depends upon the species of wood and upon the amount of moisture in the wood. For example, as disclosed on page 337 of the above mentioned reference, periodate lignin has a softening temperature of 195° C. in the dry state with virtually no water content but has a softening temperature of 90° C. with a moisture content of 27.1% water. Also, the lignin softening temperature of different species of woods varies over a wide range. Thus, a range of 134° C. to 193° C. is given for the lignin softening temperatures of the dry state lignin wood species discussed in the above-identified reference. For example, milled wood lignin spruce in a dry state has a softening temperature of 180–185° C. However, periodate lignin spruce has a dry state softening temperature of 193° C. and dioxane lignin spruce has a softening temperature in the dry state of 146° C. as discussed in the above reference. Thus, the softening temperature of the lignin depends not only on species and water content but also on the molecular size of the lignin molecules.

The use of adjustable stops in the press to control the spacing between the platens in the final press position ensures that a lap joint of a pre-determined thickness is obtained by the present invention and that the thickness of such lap joint is no greater than the thickness of a single piece of veneer. This is important to avoid any discontinuities in the thickness of plywood or laminated veneer lumber product formed by such a veneer sheet formed with the method and apparatus of the present invention.

It should be noted that it is previously been proposed to provide pairs of fixed stops or spacers in presses used for fusing together thermoplastic synthetic resin molded articles as shown in U.S. Pat. No. 4,443,288 of Sawada et al., issued Apr. 17, 1984. However, this patent does not relate to the formation of lap joints between pieces of wood veneer and does not disclose the use of adjustable stops to provide such lap joints with a pre-determined thickness which is not greater than the thickness of a single sheet of veneer in the manner of the present invention.

In addition, presses with heated platens have been used previously to form glue joints between pieces of veneer as discussed in the above cited U.S. Pat. No. 3,461,932 of Shelton et al., and U.S. Pat. No. 3,686,061 of Brown et al. However, there is no discussion in these patents of heating the platens above the lignin softening temperature of the veneer to form a stronger joint in the manner of the present invention. Instead, the platens are heated merely to cause the glue to bond the pieces of veneer together which would be at a much lower temperature than the lignin softening temperature in most cases.

As shown in U.S. Pat. No. 4,507,162 of Iwamoto issued Mar. 26, 1985 and U.S. Pat. No. 4,725,325 of Hasegawa issued Feb. 16, 1988, it is old to make a laminated wood product formed of a plurality of veneer sheets which are simultaneously glued together to form the product. However unlike tile present invention, the outer sheets of the laminated product are not separately formed by joining two veneer sheets together with a lap joint formed by overlapping square cut edges of adjacent veneer sheets and then used later to bond the outer sheets with inner sheets. Instead, the entire product is formed simultaneously in these patents.

SUMMARY OF THE INVENTION

It is therefore one object of the present invention to provide an improved method and apparatus for joining two veneer pieces together with a lap joint of greater strength having square cut edges.

Another object of the invention is to provide such an apparatus and method in which the lap joint is formed in a press with adjustable stops to form the lap joint with a pre-determined thickness approximately equal to the thickness of one of the pieces of veneer.

A further object of the present invention is to provide such an apparatus and method in which the lap joint is heated to an elevated temperature above the lignin softening temperature of the veneer during pressing to produce a lap joint of higher strength.

An additional object of the invention is to provide such an apparatus and method in which the lap joint is provided with glue between the overlapping portions of veneer and the elevated temperature also causes the glue to rapidly bond the pieces together during pressing.

Still another object of the present invention is to provide such an apparatus and method in which the lap joint is provided with an initial thickness after pressing but before cooling of approximately 90% and after cooling to room temperature of about 95% of the thickness of a single piece of veneer.

A still further object of the present invention is to provide such an apparatus and method in which the lap joint is formed by a press having two opposed platens with middle portions which arc spaced apart in their final press position by a predetermined distance corresponding to the thickness of the lap joint, and with a pair of side portions of each platen on opposite sides of the middle portions which are spaced apart a greater distance than the middle portions of the platens to produce lap joints of greater strength.

An additional object of the present invention is to provide such an apparatus and method in which the platens are formed so that the two side portions of each platen are joined to the middle portion of the platen by curved transition portions.

These and other objects and advantages of the present invention will be apparent from the following detailed description of a preferred embodiment thereof and from the attached drawings.

DETAILED DESCRIPTION OF A PREFERRED EMBODIMENT

Figure 1:
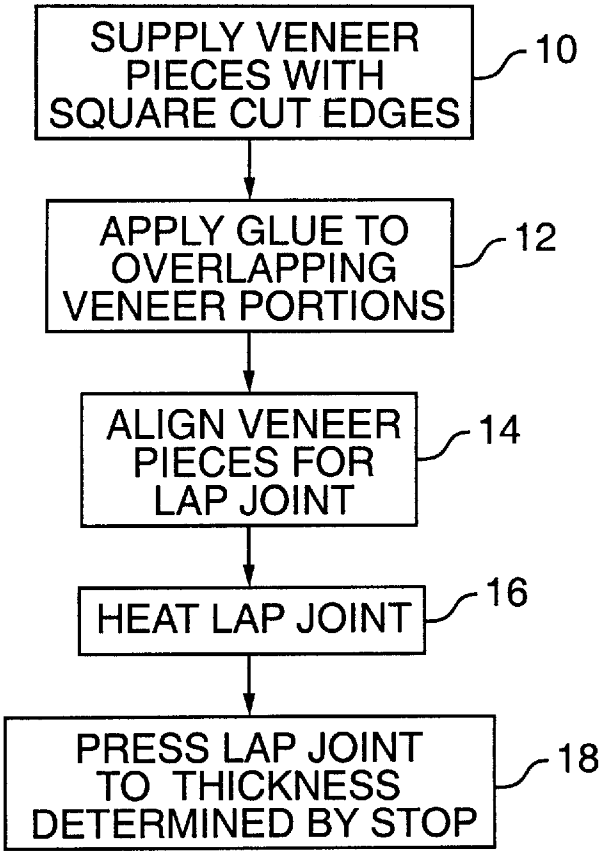
FIG. 1 is a schematic block diagram of the method and apparatus of the present invention for joining two veneer pieces together by a lap joint having square cut edges and of a pre-determined thickness.

FIG. 1 shows the preferred embodiment of the method and apparatus of the present invention by which two pieces of wood veneer are bonded together by a lap joint to form a larger sheet of veneer. The first step 10 is to provide a supply of wood veneer pieces with square cut edges of substantially the same veneer thickness. The square cut edges may be provided in a conventional manner such as by a trimming saw which cuts the piece of veneer at a 90° angle to its upper surface moving across the piece, as discussed in U.S. Pat. No. 3,461,932 of Shelton.

Figure 5:
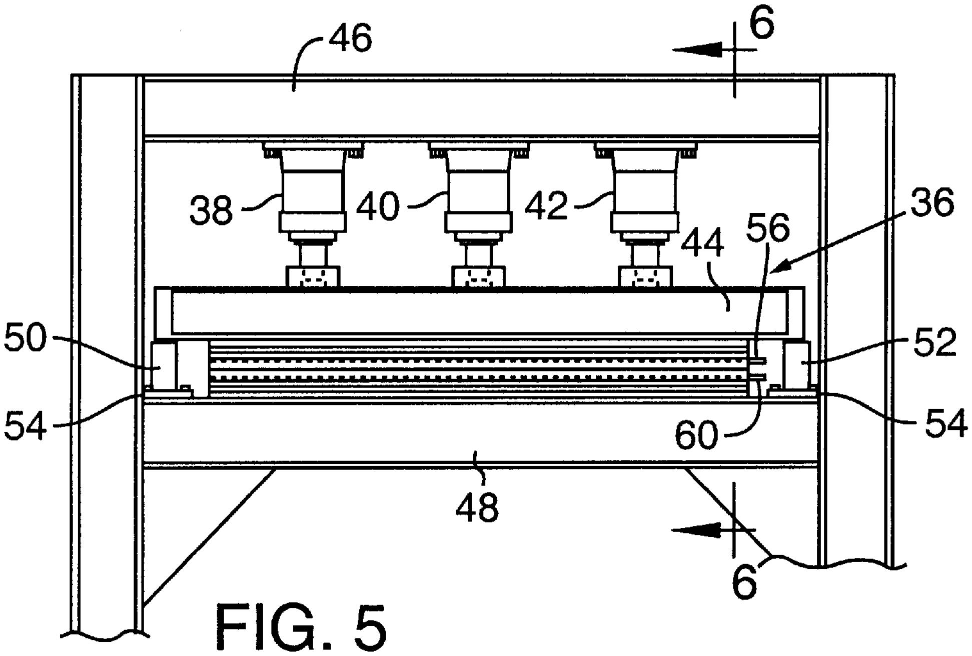
FIG. 5 is a side elevation view of a press for forming the lap joint in accordance with the present invention.

In glue application step 12 a bead of glue is applied to the surface of at least one of the veneer pieces at a position adjacent its square cut edge. Any suitable glue applicator may be employed including that which applies a bead of glue across the width of the veneer. One such glue applicator is shown in FIG. 5 of U.S. Pat. No. 3,461,932 of Shelton. Any suitable wood glue can be employed but preferably a thermosetting glue such as Borden MF 2120 type glue is employed.

Next, the two veneer pieces are aligned in a lay up step 14 so that portions adjacent their square cut edges are in an overlapping position with the glued surface of veneer positioned between such overlapped portions. Preferably the portions of the veneer pieces adjacent the square cut edges of the pieces overlap approximately three-quarters of an inch. The lay up alignment step 14 is shown in greater detail in FIG. 2 After lay up alignment the overlapping veneer is subjected to a heating step 16 which may bc accomplisheed by a separate heat source such as a radio frequency heater but is preferably provided by heating the platens of the press which press the overlapping veneer pieces together in press step 18 to form the lap joint as shown in FIG. 3. The lap joint is heated during pressing above the lignin softening temperature of the veneer pieces to be joined. As a result, the veneer pieces are heated sufficiently to enable a thermoplastic flow during pressing to form a lap joint of no greater thickness than the thickness of one of the veneer pieces. At the same time, the heat is applied to the lap joint for a sufficient time to cure the glue and bond the veneer pieces together.

Figure 4:
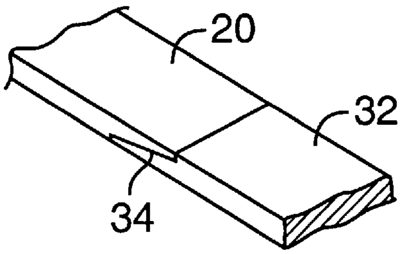
FIG. 4 shows the finished lap joint formed by the method of FIG. 1 after it is removed from the press.

The press step 18 compresses the two pieces of overlapping veneer and heats them for sufficient time to bond them together with a lap joint of a pre-determined thickness no greater than the thickness of a single veneer sheet as shown in greater detail in FIG. 3. After bonding, the lap joint is removed from the press and allowed to cool. This causes the lap joint thickness to increase slightly after it has cooled to room temperature to produce the finished lap joint shown in FIG. 4. It should be noted that the pre-determined thickness of the lap joint formed by the press is determined by the thickness of adjustable stops in the press in a manner hereafter discussed. In the preferred embodiment, the lap joint is formed with a thickness of approximately 90 percent of the thickness of a single veneer layer in the press while the lap joint is still at an elevated temperature above the lignin softening temperature. After cooling to room temperature, the lap joint then expands slightly to a thickness of approximately 95 percent of the thickness of a single piece of veneer.

Figure 2:
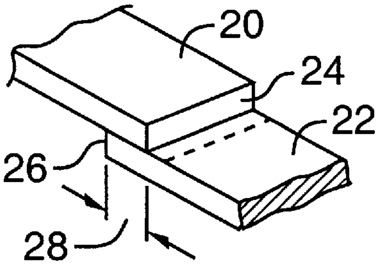
FIG. 2 is an oblique view showing the lap joint lay up position provided during the method of FIG. 1.
Figure 3:
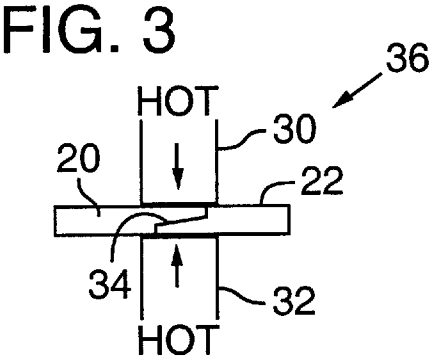
FIG. 3 is a side elevation view showing the lap joint as it is formed in a press with heated platens in accordance with one embodiment of the method of FIG. 1.

As shown in FIG. 2, a first piece of veneer 20 and second piece of veneer 22 of the same thickness are positioned in alignment with portions adjacent their square cut ends 24 and 26 overlapping by an overlap distance 28 which may be about three-quarters of an inch. The glued surface of the veneer, indicated by the dashed line in FIG. 2, is between the overlapped portions of veneer pieces 20 and 22. As shown in FIG. 3, a press 36 which includes an upper platen 30 and a lower platen 32 is operated by control cylinders (not shown) so that the platens arc pressed toward each other in the direction of the arrows with sufficient pressure to form the lap joint 34 in a manner hereafter described. As noted previously, the upper and lower platens are preferably heated electrically to a temperature above the lignin softening temperature of the veneer which is also above the bonding temperature of the glue.

In the final press position of the platens 30 and 32 shown in FIG. 3, their opposing surfaces are spaced apart by a pre-determined distance which is no greater than the thickness of one of the pieces of veneer. This pre-determined thickness is determined by adjustable stops provided in the press as hereafter described.

Figure 6:
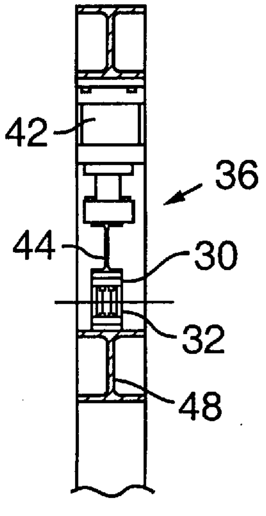
FIG. 6 is a vertical section view taken along the line 6 of FIG. 5.

As shown in FIGS. 5 and 6, the press 36 containing the upper platen 30 and lower platen 32 includes three hydraulic cylinders 38, 40, and 42 which are connected to and spaced along a moveable I-beam 44. The lower surface of the I-beam is connected to the upper platen 30. Thus, actuation of the hydraulic cylinders 38, 40, and 42 causes the I-beam 44 and the upper platen 30 to move up and down. The upper ends of the cylinders 38, 40, and 42 are connected to the fixed upper beam of a press frame 46 while the pistons of such cylinders are secured to the I-beam 44 for movement thereof. The lower platen 32 is attached to a fixed I-beam 48. A pair of press stops 50 and 52 are attached to the fixed I-beam 48 in position so that the upper surface of each of such fixed stops is engaged by the moveable I-beam 44 at its final press position thereby spacing the upper platen 30 from the lower platen 32 by a pre-determined distance. The stops 50 and 52 may be adjusted by the insertion and removal of adjustment shims 54 of different thickness to enable the joining of wood veneer of different thicknesses. The adjustment shims are preferably positioned between the bottom of the stops 50 and 52 and the top surface of the fixed I-beam 48, such stops being secured to the fixed I-beam by bolts or other suitable releasable fastener means.

Figure 8:
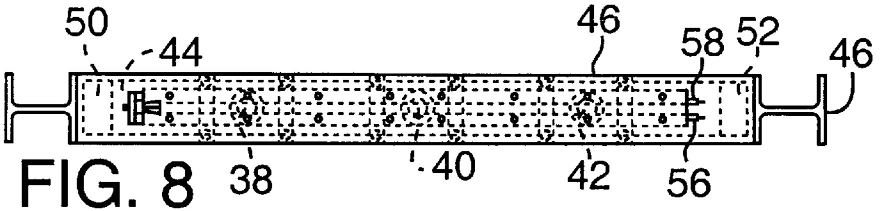
FIG. 8 is a top elevation view of the press of FIG. 5.
Figure 7A:
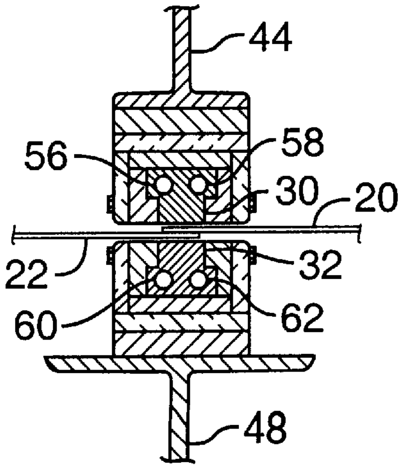
FIG. 7A is an enlarged view of a portion of the press showing the position of the overlapped pieces of veneer between the press platens before pressing to form the lap joint.
Figure 7B:
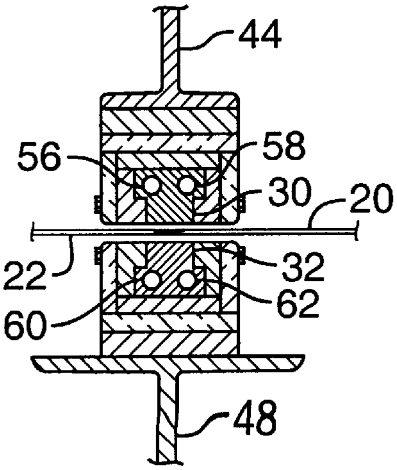
FIG. 7B is an enlarged view of a portion of the press showing the lap joint between the platens after pressing but before cooling of the lap joint.
Figure 9:
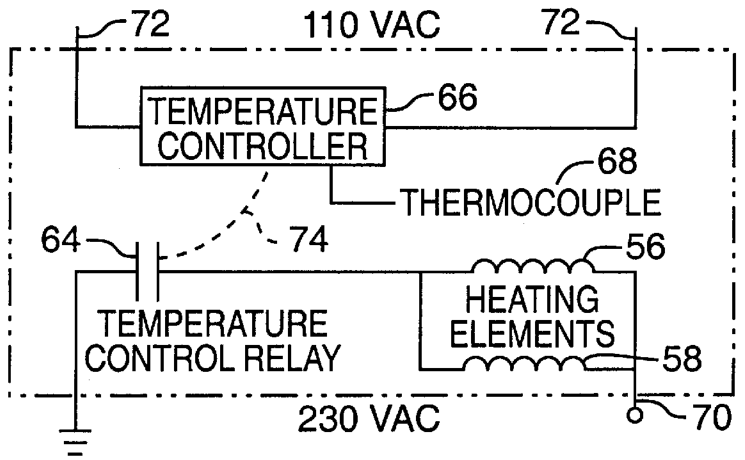
FIG. 9 is a schematic view of the electrical circuit for the heating elements employed in the pressed platens of the press of FIGS. 5–8.

Each of the platens 30 and 32 is provided with a pair of heating elements 56 and 58 and 60 and 62, respectively, and is surrounded on three sides by ceramic heat insulation plates, as shown in FIGS. 7A, 7B, and 8. As shown in FIG. 9, the two heating elements of each platen, such as elements 56 and 58 are connected in parallel with each other and in series with a temperature control relay 64, whose contacts are opened and closed by a temperature controller 66. The temperature controller is operated by a thermocouple 68 that senses the temperature of the platen in which the heating elements are mounted. The heating elements are connected at a common terminal 70 to an AC power supply of approximately 230 volts and 60 Hz, while the other terminal of the controller is connected to ground. Similarly, the temperature controller 66 is connected across an AC voltage source of 110 volts and 60 Hz at output terminals 72. Thus, the amount of current flowing through the heating elements is determined by the length of time that the temperature control relay contacts are closed by the temperature controller 66. The controller 66 operates an electromagnetic control, such as a solenoid, to open and close the contacts of relay 64 as indicated by the dashed control signal lead 74.

Figure 10:
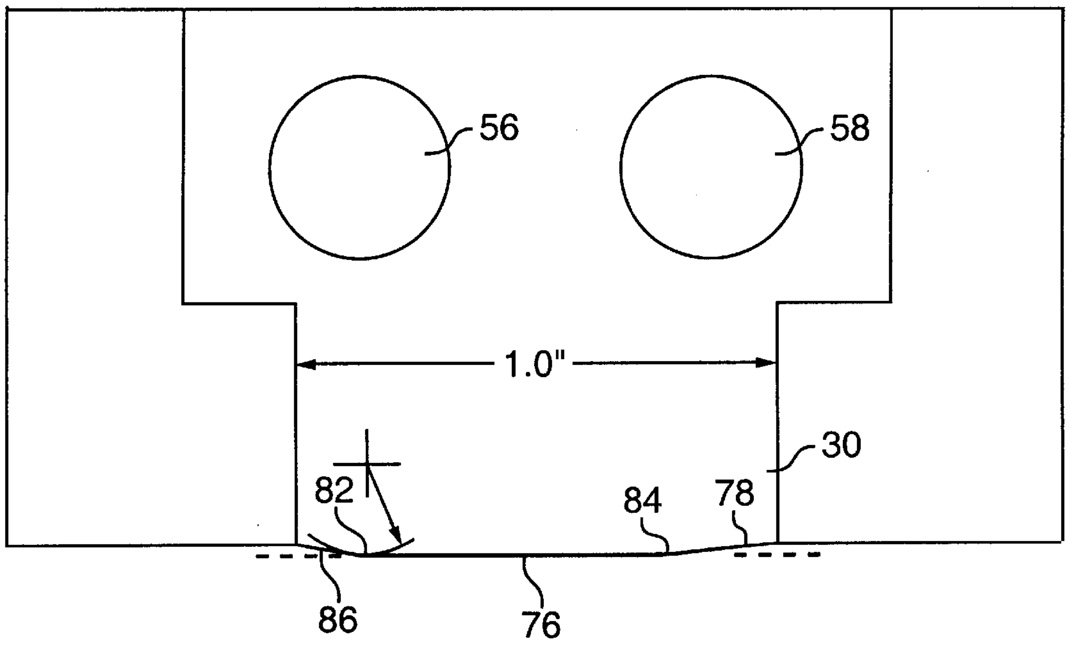
FIG. 10 is an enlarged view of one of the platens of the press showing the anvil surface of the platen with a flat horizontal middle portion and two sloping side portions on opposite sides of the middle portion which is joined thereto by two curved transition portions.

As shown in FIG. 10, each of the platens 30 and 32 is provided with an anvil surface including a middle portion 76 which is substantially flat and parallel to the middle portion of the other platen. The anvil surface also includes a pair of side portions 78 and 80 which are angled upward from the middle portions and are spaced away from corresponding side portions on the other platen a greater distance than the middle portions are so spaced in the final downward position of the platens to form the lap joint. In addition, curved transition portions 82 and 84 are provided to join the side portions 78 and 80 respectively to the middle portion 76 of the platen anvil surface. This prevents the platen from cutting the fibers of the wood veneer during pressing which would otherwise reduce the strength of the finished lap joint. It should be noted that the curved transition portions 82 and 84 have a radius of curvature of approximately one-half inch in the embodiment shown in FIG. 10. The width of the anvil portion of the upper and lower platens is approximately one inch wide and the middle portion 76 is three-quarters of an inch wide to produce a lap joint of approximately three-quarters inch wide so that the side portions 78 and 80 are approximately one-eighth inch wide each.

In one example of a preferred lap joint having square cut edges, veneer pieces of Douglas Fir having a thickness of 0.14 inch are joined by a lap joint 28 of three-quarter inch width using Borden MF2120 glue which spreads at 60 lbs/1000 sq. ft. A platen temperature of 500° F. or 260° C. was used with a press platen pressure of 600 lbs/sq. in. with the stops 50 and 52 set at a final gap spacing of 0.120 inch and a pressing time of 10 seconds. This resulted in lap joints having strengths of approximately 75 percent of that of the same veneer without a joint. It should be noted that with the above example, the initial thickness of the lap joint before cooling is about 85.7 percent of the thickness of one piece of veneer. However, after cooling the thickness of the lap joint increases approximately 5 percent after it is cooled to room temperature so that the final thickness of the lap joint is approximately 90 percent of the thickness of one piece of veneer. Also it should be noted that the moisture content of the veneer may be anywhere from 10–80 percent moisture for undried veneer and less than 10 percent for dried veneer either of which can be used to form the lap joint in the manner of the present invention. Also, any suitable thickness of veneer can be employed but is preferably within the range of about $\frac{1}{16}$ of an inch to $\frac{1}{6}$ of an inch of veneer.

It will be obvious to those having ordinary skill in the art that many changes may be made in the above described preferred embodiment of the present invention without departing from the spirit of the invention. Therefore, the scope of the present invention should only be determined by the following claims.

We claim:

1. A method of joining wood veneer pieces to form a larger sheet of veneer, comprising the steps of:

supplying two pieces of wood veneer each with a substantially square cut edge;

applying glue to the surface of at least one of said pieces adjacent to its square cut edge;

overlapping the portions of pieces adjacent to the square cut edges with the glue surface positioned between the overlapped portions;

pressing the overlapped portions of said pieces together to form a lap joint between said pieces in which the glue joins the two pieces together into a sheet of veneer, said lap joint being compressed to a predetermined thickness approximately equal to the thickness of one of said pieces of veneer.

2. A method in accordance with claim 1 which also includes the step of heating the overlapping portions of said two pieces to an elevated temperature above their lignin softening temperature prior to pressing.

3. A method in accordance with claim 2 in which the step of heating the overlapped portions of the veneer pieces to an elevated temperature causes the glue to rapidly bond said pieces together during pressing.

4. A method in accordance with claim 2 in which the heating step and pressing step are performed when the overlapped portions are pressed together in a press with two platens on opposite sides thereof.

5. A method in accordance with claim 4 in which the press includes a stop for limiting the final spacing between platens so that the predetermined thickness of the lap joint after the pressing is approximately equal to the thickness of a single piece of said veneer.

6. A method in accordance with claim 5 in which the thickness of the lap joint is no greater than the thickness of one of said pieces.

7. A method in accordance with claim 6 in which the initial thickness of the lap joint after pressing and before cooling to room temperature is approximately 90 percent of the thickness of a single piece of said veneer.

8. A method in accordance with claim 7 in which the final thickness of the lap joint after pressing step and after cooling to room temperature is approximately 95 percent of the thickness of a single piece of said veneer.

9. A method in accordance with claim 1 in which the pressing step to form the lap joint is applied by platens having middle portions which are spaced apart in their final pressed position by a predetermined distance corresponding to said predetermined thickness and side portions of the platens on opposite sides of the middle portions of both platens are spaced apart a greater distance than the middle portions of the platens.

10. A method in accordance with claim 9 in which the two side portions of each of the platens are joined to said middle portion by curved transition portions.

* * * * *